United States Patent [19]

Asai

[11] Patent Number: 5,802,240
[45] Date of Patent: *Sep. 1, 1998

[54] VIDEO EDITING APPARATUS

[75] Inventor: Toshiya Asai, Kanagawa, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 637,400

[22] Filed: Apr. 25, 1996

[30] Foreign Application Priority Data

Apr. 28, 1995 [JP] Japan .................... 7-106680

[51] Int. Cl.$^6$ .................. G11B 27/00; H04N 5/93
[52] U.S. Cl. .................. 386/52; 386/109; 386/111; 386/112
[58] Field of Search .................. 386/4, 33, 52, 386/64, 109, 111, 112; 360/8, 13, 61, 62, 63, 64

[56] References Cited

U.S. PATENT DOCUMENTS

| | | | |
|---|---|---|---|
| 5,418,658 | 5/1995 | Kwon | 386/111 |
| 5,438,423 | 8/1995 | Lynch et al. | 386/109 |
| 5,517,322 | 5/1996 | Hirayama | 386/93 |
| 5,521,898 | 5/1996 | Ogasawara | 386/112 |
| 5,572,333 | 11/1996 | Moriyama et al. | 386/112 |
| 5,631,742 | 5/1997 | Shimoda | 386/52 |

*Primary Examiner*—Thai Tran
*Assistant Examiner*—Aung S. Moe
*Attorney, Agent, or Firm*—Frommer Lawrence & Haug LLP; William S. Frommer

[57] ABSTRACT

A video editing apparatus which can perform editing in units of frames with respect to video data encoded by GOPs using inter-frame correlation, in which video data recorded on an MO disc drive is decoded by an MPEG decoding unit and a predetermined frame of the decoded video data is substituted with other video data selected by a switch. The new video data including also the pictures of the frames before and after this is subjected to re-encoding at the MPEG encoding unit in a state where the original GOP frame structure before editing is maintained based on the signal indicating the punctuation of GOP input from the MPEG decoding unit and is recorded on the MO disk drive.

10 Claims, 4 Drawing Sheets

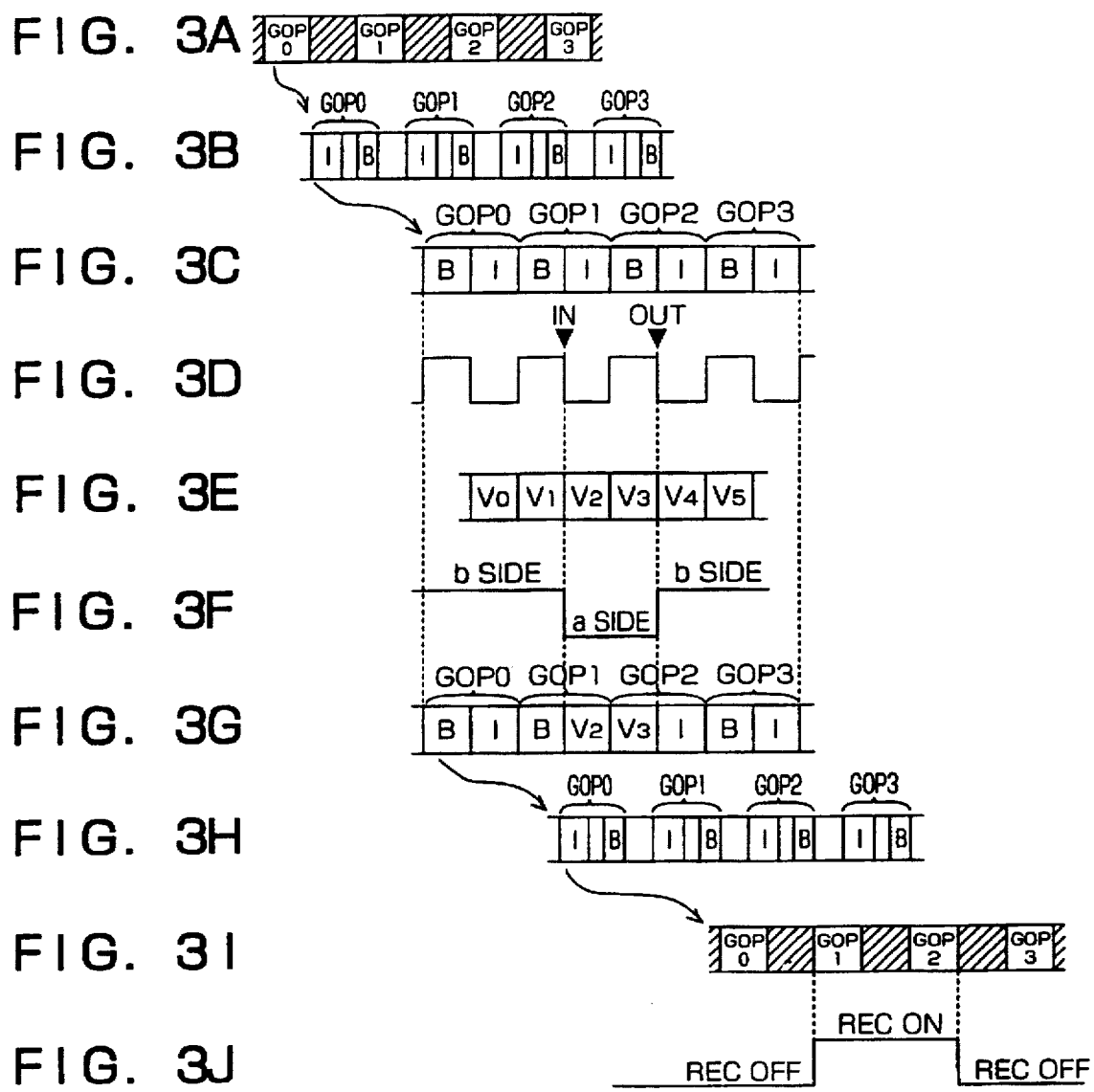

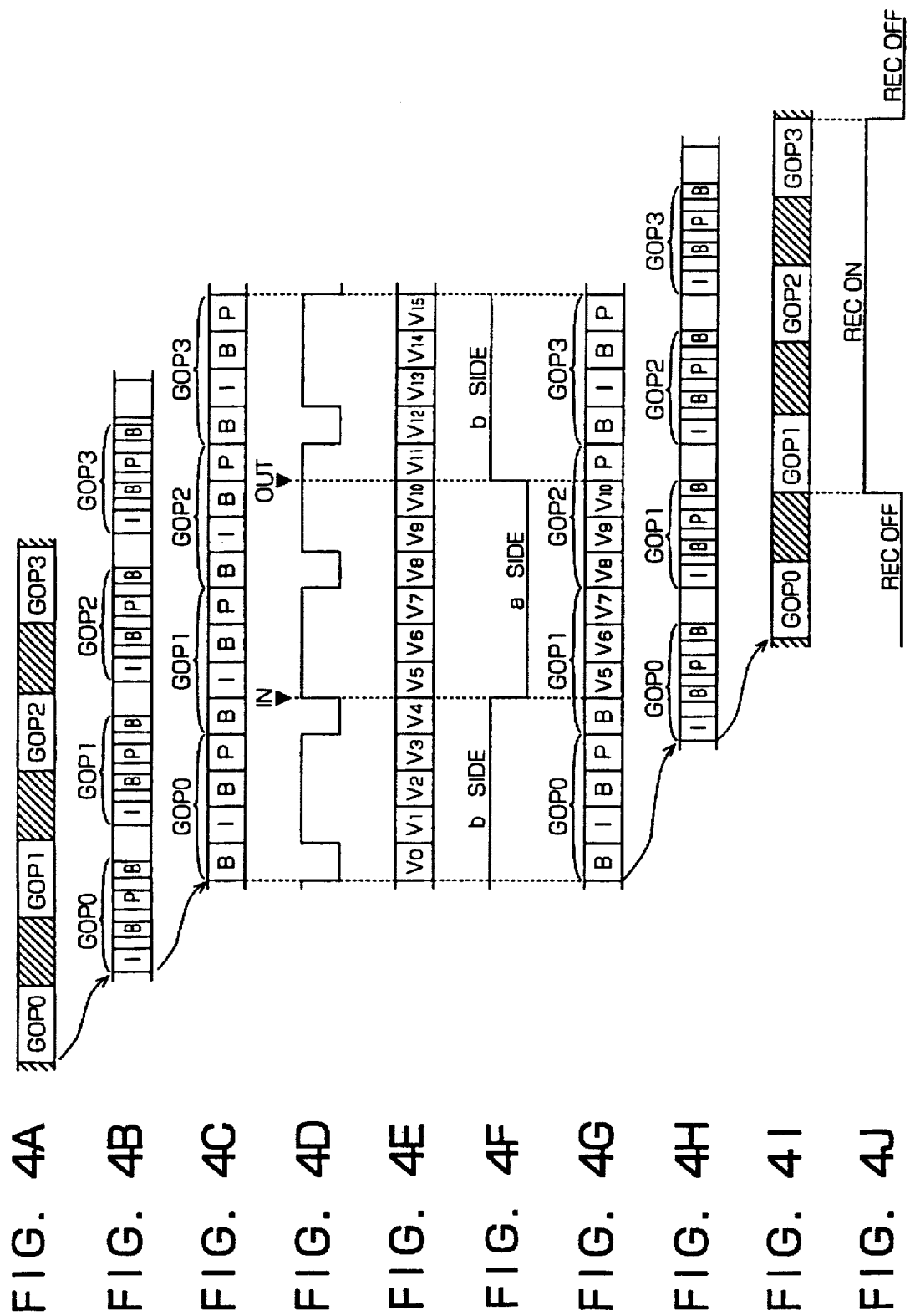

VIDEO EDITING APPARATUS

BACKGROUND OF THE INVENTION

1. Field of the Invention

The present invention relates to a video editing apparatus which can suitably perform editing on any frame of video data recorded compressed and encoded in groups of pictures (GOP) of predetermined numbers of frames utilizing the inter-frame correlation.

2. Description of the Related Art

In general, in a continuous moving picture, the adjoining pictures very closely resemble each other. Therefore, when performing the compression and encoding is for transmitting or recording a moving picture, use is made of the method of utilizing this property, taking the difference between adjoining pictures, and encoding this differential value so as to reduce the redundancy in the time axis direction and reduce the amount of data.

An encoding algorithm of such a moving picture standardize d by the MPEG (Moving Picture Experts Group) will be explained (hereinafter, this encoding method will be referred to as the MPEG).

In the MPEG, three types of pictures are encoded: an I-picture (intra-coded picture), P-picture (forward direction predictive-coded picture), and B-picture (bidirectionally predictive-coded picture).

The I-picture is a picture encoded by using only closed information of only one picture without use of prediction. Accordingly, with an I-picture, the picture can be reconstructed just by the information of the I-picture per se even at the time of decoding.

The P-picture is a frame using prediction in one direction. Namely, it is a frame previously input in time as a predictive picture which becomes the reference for the difference. Use is made of an already decoded I-picture or P-picture.

The B-picture is a frame using prediction in both directions. As the predictive picture, use is made of three types of pictures, i.e., the I-picture or the P-picture which is previously positioned in time and has been already decoded, the I-picture or the P-picture which is positioned later in time and has been already decoded, and the supplemental picture formed from the two.

The GOP is constructed by a series of pictures including one or more I-pictures. The processing of the latter stages such as transmission or recording is carried out in units of these GOPs.

In the case of video data for which encoding utilizing the inter-frame correlation as mentioned before is carried out, there is a problem in that the editing such as replacement of the video data of one part with other video data cannot be adequately carried out.

Namely, in the above encoding system, if editing such as substitution of the videos in units of GOP etc. is carried out, the editing can be carried out while relatively eliminating the deterioration of the picture quality, but where the replacement of the video from a frame in the middle of the GOP is carried out inside a GOP or over a plurality of GOPs, there arises a problem that the continuity of the GOP sequence cannot be held and it becomes impossible to perform the decoding of a normal picture.

SUMMARY OF THE INVENTION

An object of the present invention is to provide a video editing apparatus which can perform the editing in units of any frames with respect to the video data encoded for every GOP by using the inter-frame correlation without causing a deterioration of the image quality.

According to a first aspect of the present invention, there is provided a video editing apparatus compressing a video signal and recording it on a recording medium, reproducing and decoding the recorded video signal, and compressing and recording another video signal on the compressed and recorded video signal, including a decoding means for receiving as its input a video signal compressed and encoded in units of GOPs (group of picture) composed of a plurality of continuous frames using the inter-frame correlation and decoding the video signal; a switching means for selectively outputting a video signal supplied from the decoding means and a video signal input from the outside; and an encoding means for compressing and encoding a video signal supplied from the switching means again so that the frame structure becomes the same as GOP frame structure at the time of compressing and encoding the video signal before the switching processing based on said GOP frame structure.

Preferably, the decoding means outputs a GOP head pulse showing the head frame of the GOP from the compressed and encoded video signal which is input and the encoding means compresses and encodes the supplied GOP head pulse and the video signal supplied from the switching means.

Preferably, the encoding means compresses the video signal by the MPEG system and the decoding means decodes the compressed video signal by the MPEG system.

According to a second aspect of the invention, there is provided a video editing apparatus compressing a video signal and recording it on a recording medium, reproducing and decoding the recorded video signal, and compressing and recording another video signal on the compressed and recorded video signal, including a decoding means for receiving as its input a video signal compressed in units of GOPs (group of picture) composed of a plurality of continuous frames using the inter-frame correlation and decoding the video signal; a control unit for outputting a selection control signal; a switching means for selectively outputting a video signal supplied from the decoding means and a video signal input from the outside based on the selection control signal supplied from the control unit; and an encoding means for compressing and encoding a video signal supplied from the switching means again so that the frame structure becomes the same as GOP frame structure at the time of compressing and encoding the video signal before the switching processing based on said GOP frame structure.

Preferably, the control unit is connected to an external interface and outputs the selection control signal based on an edit signal supplied via the interface.

Alternatively, the control unit is connected to an external interface and outputs a recording control signal based on the edit signal supplied via the interface and a video signal compressed and encoded based on the recording control signal is recorded on the recording medium.

Preferably, the decoding means detects the GOP head pulse indicating the head frame of the GOP from the compressed and encoded video signal which is input and the encoding means compresses and encodes the video signal supplied from the switching means in synchronization with the GOP head pulse.

Preferably, the encoding means compresses the input video signal by the MPEG system and the decoding means decodes the compressed and encoded video signal by the MPEG system.

BRIEF DESCRIPTION OF THE DRAWINGS

These and other objects and features of the present invention will become clearer from the following description of the related art and the preferred embodiments made with reference to the attached drawings, in which:

FIGS. 1A and 1B are views explaining a basic method of method of encoding a moving picture by the MPEG, in which FIG. 1A is a view of the picture of a frame of an input picture and FIG. 1B is a view of the order of the encoded data to be transmitted;

FIGS. 3A to 3J are timing charts showing the flow of the signals where insert editing is carried out with respect to a video signal having a GOP length of 2 frames in a video editing apparatus shown in FIG. 2, in which FIG. 3A is a view of a disc reproduction signal; FIG. 3B is a view of compressed reproduction data after rate conversion; FIG. 3C is a view of non-compressed reproduction data; FIG. 3D is a view of a GOP head frame pulse; FIG. 3E is a view of an insert video signal; FIG. 3F is a view of a data select signal; FIG. 3G is a view of a video signal after editing; FIG. h is a view of compressed recording data before rate conversion; FIG. 3I is a view of a disc recording signal; and FIG. 3J is a view of a recording control signal; and FIGS. 4A to 4J are timing charts showing the flow of the signal where insert editing is carried out with respect to a video signal having a GOP length is 4 frames in the video editing apparatus shown in FIG. 2, in which FIG. 4A is a view of the disc reproduction signal; FIG. 4B is a view of compressed reproduction data after rate conversion; 4C is a view of non-compressed reproduction data; and FIG. 4D is a view of the GOP head frame pulse; FIG. 4E is a view of the insert video signal; FIG. 4F is a view of a data select signal; and FIG. 4G is a view of the video signal after editing; FIG. 4H is a view of the compressed recording data before rate conversion; FIG. 4I is a view of the disc recording signal; and FIG. 4J is a view of the recording control signal.

DESCRIPTION OF THE PREFERRED EMBODIMENTS

A concrete explanation will be made below of this MPEG encoding referring to FIGS. 1A and 1B.

Figures 1A, 1B:
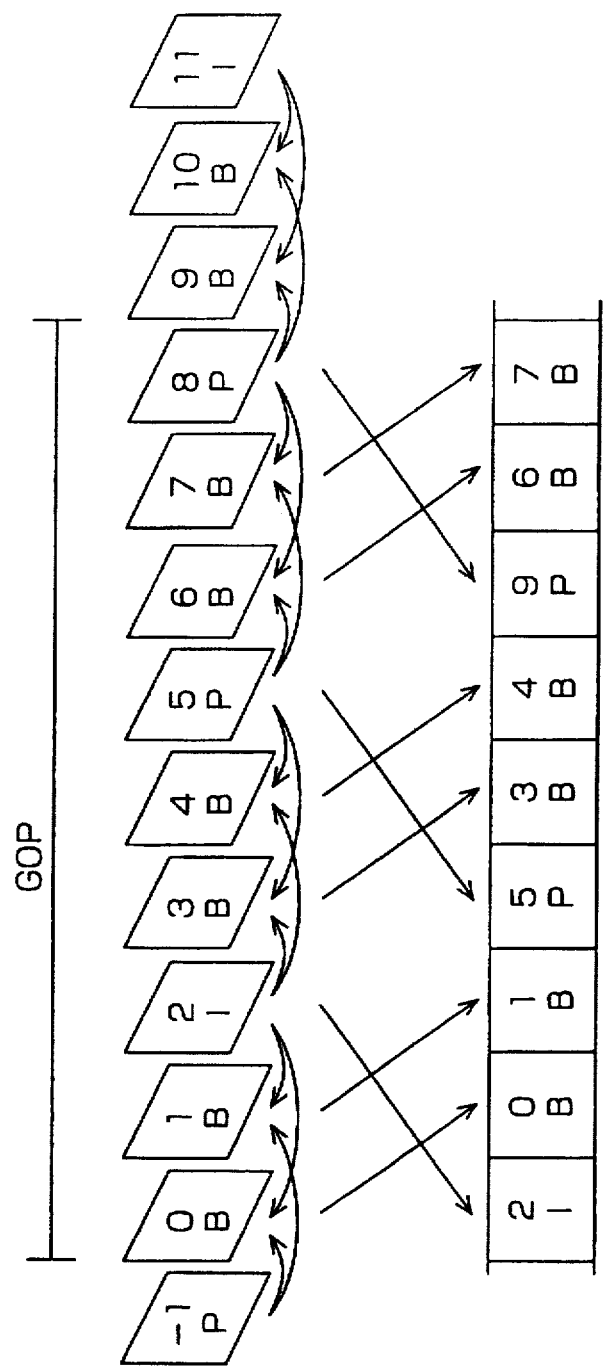

FIGS. 1A and 1B are views explaining the method of MPEG encoding, in which FIG. 1A is a view of the picture of a frame of the input pictures; and FIG. 1B is a view of the order of the encoded data to be transmitted. Note that, in FIGS. 1A and 1B, the numerals indicate the frame numbers, I, B, and P indicate the types of the pictures, and the arrows in FIG. 1A indicate the relationship of prediction.

In the example shown in FIGS. 1A and 1B, one GOP is constructed by 9 frames from frame 0 to frame 8.

In this GOP, the frame 2 is the I-picture. This picture is encoded only by this I-picture. Then, based on this I-picture, the P-picture of the frame 5 and further the P-picture of the frame 8 are subjected to predictive encoding.

Then, based on these I-picture and P-picture, the B-picture between them is subjected to predictive encoding. Namely, the B-pictures of the frame 0 and the frame 1 are subjected to the predictive encoding based on the P-picture of the frame 1 and the I-picture of the frame 2, and the B-pictures of the frame 3 and the frame 4 are subjected to the predictive encoding based-on the I-picture of the frame 2 and the P-picture of the frame 5, respectively. Further, based on the P-picture of the frame 5 and the P-picture of the frame 8, the B-pictures of the frame 6 and the frame 7 are subjected to predictive encoding.

Note that, in consideration with the order of processing of these predictive encoding and the required picture at the decoding, at the transmission or recording, the processing is carried out in the frame order as shown in FIG. 1B.

However, with respect to video data for which the encoding utilizing the inter-frame correlation as mentioned before is carried out, it suffers from the disadvantage in that the editing such as replacement of the video data of one part with other video data cannot be adequately carried out.

Namely, in the above encoding system, if the editing such as substitution of the videos in units of GOP etc. is carried out, the editing can be carried out while relatively eliminating the deterioration of the picture quality, but where the replacement of the video from a frame in the middle of the GOP is carried out inside a GOP or over a plurality of GOPs, there arises a problem that the continuity of the GOP sequence cannot be held and it becomes impossible to perform the decoding of a normal picture.

According to the editing apparatus of the present invention, the video data recorded in the recording and reproducing means is decoded by the decoding means. The decoded video data in a non-compressed state, that is, a state where there is no inter-frame correlation, is edited by the editing means. Then, re-encoding is carried out by the encoding means in a state where the original GOP frame structure before editing is maintained based on the signal indicating the punctuation of a GOP obtained at the decoding by the decoding means and recorded again by the recording and reproducing means.

An embodiment of the video editing apparatus of the present invention will be explained.

Figure 2:
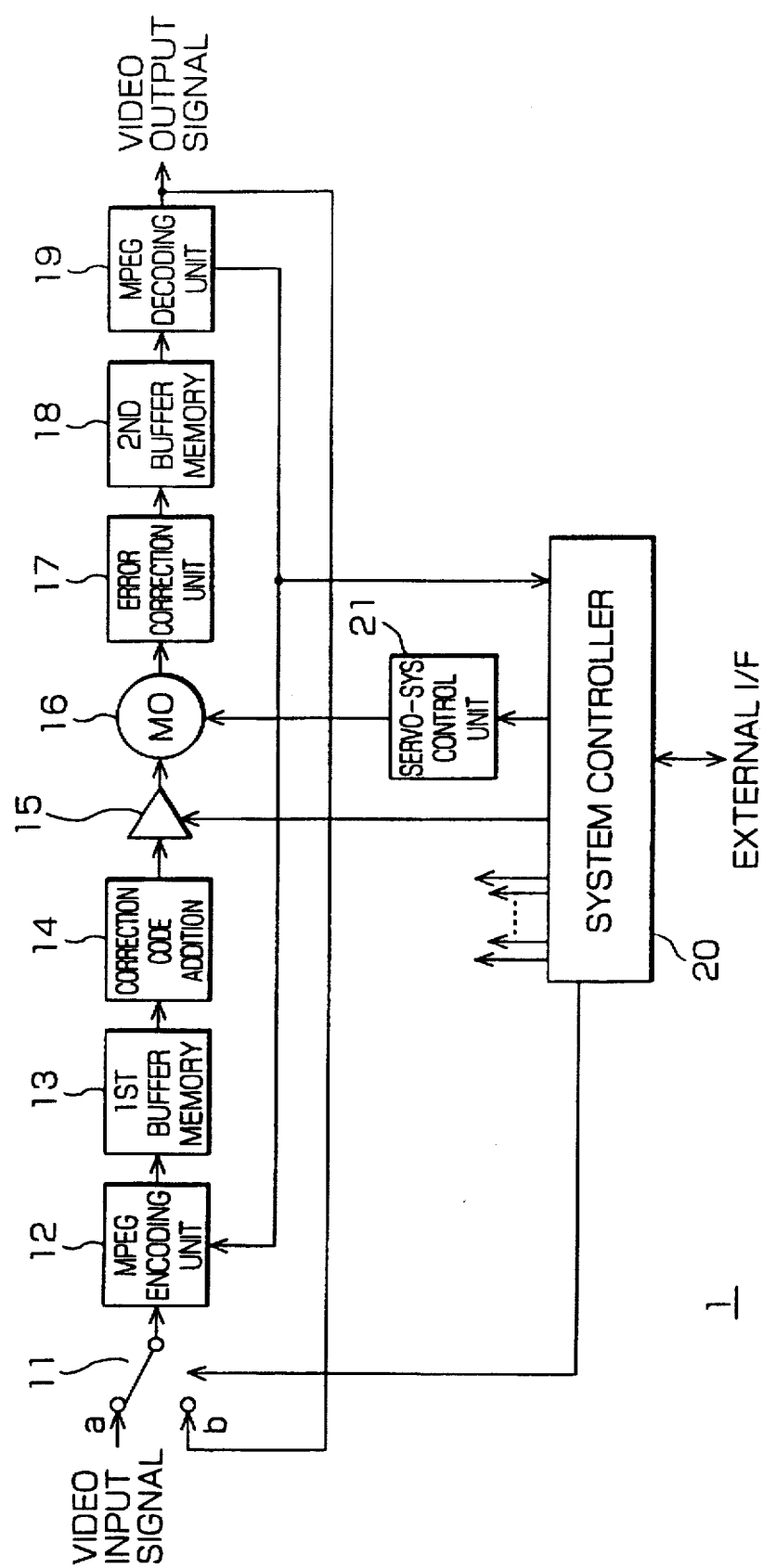
FIG. 2 is a block diagram of the configuration of a video editing apparatus according to an embodiment of the present invention.

FIG. 2 is a block diagram showing the configuration of a video editing apparatus of the present embodiment.

The video editing apparatus 1 has a switch 11, an MPEG encoding unit 12, a first buffer memory 13, a correction code addition unit 14, a recording amplifier 15, an MO disc drive 16, an error correction unit 17, a second buffer memory 18, an MPEG decoding unit 19, a system controller 20, and a servo system control unit 21.

The video editing apparatus 1 of the present embodiment uses a magneto-optic disc (MO disc) device as a recording medium and is a digital video disc recorder which compresses the same picture by MPEG and records the same.

An explanation will be made of the configuration of the respective parts.

The switch 11 is a selector which selects the video signal to be output to the recording system. By the switch 11, where the video signal is normally recorded on the MO disc, a terminal (contact) a is selected to output the digital video signal input from the outside to the recording system. Further, where the editing etc. are carried out, the switch 11 is appropriately changed over to select the recording data. For example, in insert editing, where a new video signal to be inserted is selected, the switch 11 is changed over to the terminal a, and where the original reproduction video signal to be inserted is selected, the switch 11 is changed over to a terminal (contact) b.

Note that, the select signal for controlling the changeover of the switch 11 is input from the system controller 20.

The MPEG encoding unit 12 compresses and encodes the input non-compressed video signal by the MPEG format. The MPEG encoding unit 12 performs the encoding so that the continuity to the GOP sequence in the original video signal can be held based on the GOP head frame pulse of the reproduction video signal input from the MPEG decoding unit 19 when re-encoding the video signal which is once reproduced in a case where the editing, etc. are carried out.

The first buffer memory 13 performs the rate conversion for recording the compressed video signal on the disc.

The correction code addition unit 14 adds the code word for the error correction.

The recording amplifier 15 is a means for amplifying the data for recording to which also the error correction code is added for finally recording the same on the MO disc. At the editing, however, the recording amplifier 15 selects the recording data based on the recording control signal input from the system controller 20. Namely, the output is controlled so that only the desired data from among the data for recording to which also the error correction code is added is actually recorded on the MO disc. Note that, the selection of the data is carried out in units of GOPs.

The MO disc drive 16 is a recording apparatus for actually recording the input recording data on the MO disc.

The servo system control unit 21 controls the servo system of the disc drive of the MO disc drive 16.

The error correction unit 17 performs the processing for the error correction with respect to a signal reproduced by the MO disk drive 16.

The second buffer memory 18 performs the rate conversion of the reproduced compressed video signal. The second buffer memory 18 adjusts the rate of the compressed video signal to be input to the MPEG decoding unit 19 so that the reproduced picture is adequately output from the MPEG decoding unit 19.

The MPEG decoding unit 19 decodes the reproduced compressed video signal and converts the same to a non-compressed digital video signal. The converted digital video signal is output from the output terminal and, at the same time, input to the terminal b of the switch 11 so that the editing etc. can be carried out.

Further, the MPEG decoding unit 19 generates a signal indicating the GOP head frame of the decoded non-compressed digital video signal and outputs the same to the MPEG encoding unit 12 and the system controller 20.

Note that the processing system comprising the error correction unit 17, the second buffer memory 18., and the MPEG decoding unit 19 reproducing the compressed video signal recorded on the MO disk is referred to as the reproduction system.

The system controller 20 is a control unit for controlling the operations of the portions constituting the video editing apparatus 1 and the entire video editing apparatus 1 and is constructed by a usual processor etc. For example, the system controller 20 controls the servo system control unit 21 and controls the operation of the MO disk drive 16.

Further, the system controller 20 has an interface means with the outside, i.e. an external interface (I/F) In the present embodiment, this interface means is an RS-422. The video editing apparatus 1 its operated by a control device such as a remote control device connected by the external I/F. Namely, the operation signal from the outside is input to the system controller 20 via the external I/F.

Further, the system controller 20 particularly generates a control signal as follows where for example the editing of a video is carried out. First, the timing of frame synchronization between the video signal to be reproduced and the video signal which is input is controlled and then the system controller 20 generates the select signal of the switch 11 from among the edit signals input via the external I/F such as a RS-42 and applies the same to the switch 11. Further, similar to the select signal, the system controller 20 generates a recording control signal performing the selection of the data to be recorded in the recording amplifier 15 based on the edit signal input via the external I/F such as the RS-422 from the outside.

Next, an explanation will be made of the operation of the video editing apparatus 1 referring to FIGS. 3A to 3J to FIGS. 4A to 4J.

It is possible for the select signal of the switch 11 and recording control signal to be generated by one edit signal. At this time, it is sufficient so far as the recording control signal delayed with respect to the select signal exactly by an amount of delay caused by the supply of the signal to the MPEG encoding unit 12, the first buffer memory, and the correction code addition unit 14 is generated.

First, an explanation will be made of the processing where insert editing is carried out with respect to a video signal having a GOP length of 2 frames referring to FIGS. 3A to 3J.

FIG. 3A to 3J are timing charts showing the flow of the signal of the insert editing where the GOP length is 2 frames.

When the MO disc on which the video signal to be edited is reproduced at the MO disk drive 16, the reproduction output as shown in FIG. 3A is obtained. The video signal is reproduced and output in units of GOPS.

This output data is subjected to error correction at the error correction unit 17, then subjected to buffering and rate conversion at the second buffer memory 18 and arranged like compressed data composed of the I-picture and B-picture in units of frames as shown in FIG. 3B.

This compressed data is decoded by the MPEG decoding unit 19 and becomes the non-compressed data stream as shown in FIG. 3C. Also, at this time, a pulse indicating the head frame of GOP as shown in FIG. 3D is generated and input to the MPEG encoding unit 12 and the system controller 20. This pulse is generated when the head frame of GOP, that is, the I-picture, is detected when decoding the compressed data which is input by the MPEG decoding unit 19. This pulse is output from the MPEG decoding unit 19 at the timing of outputting for example the non-compressed data.

The MPEG encoding unit 12 and the system controller 20 work in synchronization with this pulse. The insert editing substituting the portion between the point IN and point OUT with the other video signal is carried out with respect to the reproduced video signal as shown in FIG. 3C. Namely, two frames of the frames V2 and V3 of the insert video signal as shown in FIG. 3E are inserted in the second frame of the GOP 1 and first frame of GOP 2 of the reproduced video signal.

In this case, first the system controller 20 performs the timing management of the frame synchronization and then generates the recording data select signal as shown in FIG. 3F based on the edit signal input via the external I/F and applies this to the switch 11. In the switch 11, the recording data is selected based on this select signal. Namely, the switch 11 is changed over so as to be connected to the terminal a only in the portion between the point IN and point OUT, whereby only the signals of the frames V2 and V3 of the insert video signal input from the outside are output to the recording system. During the other periods, the switch 11 is changed over so as to be connected to the terminal b, whereby the reproduced non-compressed data stream is output to the recording system. As a result, the non-compressed data stream as shown in FIG. 3G is input to the recording system.

This non-compressed data stream is compressed by the MPEG coding unit 12 again and the compressed data stream as shown in FIG. 3A is generated. Note that, when the non-compressed data stream is encoded again at this MPEG encoding unit 12, the encoding must be carried out so as to hold the GOP sequence in the original reproduction stream. The encoding for holding the GOP sequence is carried out in the MPEG encoding unit 12 by using the GOP head frame pulse shown in FIG. 3D input from the MPEG decoding unit 19.

The compressed video data stream is subjected to the rate conversion by the first buffer memory 13, the error correction code is added at the correction code addition unit 14, and the compressed data for every GOP which can be recorded on the MO disc as shown in FIG. 3I is obtained.

Then, in the recording amplifier 15, based on the recording control signal supplied from the system controller 20 as shown in FIG. 3J, only the desired GOP data is recorded on the MO disc by the MO disc drive 16. The recording control signal is generated by the system controller 20 based on the edit signal input via the external I/F such as an RS-422. In the example of FIGS. 3A to 3J, the recording of the videos of GOP1 and GOP2 is tried again by the newly encoded video signal.

Next, an explanation will be made of the insert editing where the GOP length is 4 frames referring to FIGS. 4A to 4J.

FIGS. 4A to 4J are timing charts showing the flow of the signal of the insert editing where the GOP length is 4 frames.

In a case where the GOP length becomes 4 frames, the basic operation is the same as that in the case where the GOP length is 2 frames mentioned before.

First, when the video signal to be edited is reproduced at the MO disc drive 16, the reproduced output as shown in FIG. 4A is obtained. This output data is subjected to the error correction at the error correction unit 17, subjected to the buffering and rate conversion at the second buffer memory 18, and converted to the arrangement of the compressed data in units of frames as shown in FIG. 4B. Further, this compressed data is decoded by the MPEG decoding unit 19 and becomes the non-compressed data stream as shown in FIG. 4C. At this time, the GOP head frame pulse generated at the MPEG decoding unit 19 becomes as shown in FIG. 4D and is input to the MPEG coding unit 12 and the system controller 20, which operate in synchronization with this pulse.

This pulse is generated when the head frame of the GOP, that is, the I-picture, is detected when the MPEG decoding unit 19 decodes the compressed data which is input. This pulse is output from the MPEG decoding unit 19 at the timing of for example outputting the non-compressed data. Where the portion between the point IN and point OUT shown in FIG. 4C of such a reproduced video signal is substituted with another video signal as shown in FIG. 4E, at first the system controller 20 generates the recording data select signal as shown in FIG. 4F based on the edit signal input via the external I/F. Based on this select signal, the switch 11 appropriately selects the input data and the non-compressed data stream in which the new video signal is inserted is obtained as shown in FIG. 4G.

This non-compressed data stream is compressed at the MPEG encoding unit 12 again. The compressed data stream as shown in FIG. 4H is generated and further subjected to the rate conversion at the first buffer memory 13, the error correction code is added to this at the correction code addition unit 14, and the compressed data for every GOP which can be recorded on the MO disc as shown in FIG. 4I is obtained.

Then, in the recording amplifier 15, based on the recording control signal as shown in FIG. 4J, only the desired GOP data is recorded on the MO disc by the MO disc drive 16. The recording control signal is generated by the system controller 20 based on the edit signal input via the external IF. In the example of FIGS. 4A to 4G, the new insertion of the video of GOP 3 is not actually carried out, but the B-picture of the GOP 3 is influenced by the insertion, so also this GOP 3 is recorded again by the newly encoded video signal.

Where such an insert editing as exemplified in FIGS. 3A to 3J to FIGS. 4G to 4J is carried out, the point IN and point OUT thereof are positioned in the middle of the GOP of the reproduced video signal, and the recording to the MO disc is carried out in units of GOPs. Therefore if the recording is carried out by compressing only the pictures between the point IN and point OUT, the GOP sequence cannot be continued. In the video editing apparatus 1 of the present embodiment, however, the data is appropriately selected at the stage of the non-compressed data stream and inserted in the reproduced data, and the re-encoding is carried out. Therefore, insert editing where the change of the video occurs in the GOP while holding the GOP sequence can be carried out.

Note that, the video editing apparatus of the present invention is not limited to the present embodiment. Various modifications are possible.

For example, the configuration of the video editing apparatus is not limited to the configuration shown in FIG. 2 and may be any configuration. More specifically, any method can also be used for the rate conversion by the first buffer memory and the second buffer memory and for the error correction in the correction code addition unit and the error correction unit. It is also possible even if they do not exist where the input and output data satisfy the predetermined conditions. Further, also the concrete circuit configuration of the recording amplifier and system controller can be any configuration. Further, also the concrete circuit configuration of the servo system control unit controlling the MO disk drive can be any configuration.

Also, in the present embodiment, an MO disc was used as the recording medium for recording the video data, but the recording medium is not limited to this. It is also possible to use any recording medium such as a hard magnetic disc, compact disc (CD), digital video disc (DVD), etc. as the recording medium of the video data.

Also, an explanation was made of the editing in the video editing apparatus of the present embodiment for the insert editing substituting a predetermined frame of the original video data with other video data, but the editing is not limited to this. Any editing can be carried out. For example, it is also possible to perform the editing for applying a special effect to a predetermined frame of the original video data, cut a predetermined section, and insert completely new video data.

According to the video editing apparatus of the present invention, by using the inter-frame correlation, the editing an be carried out in units of frames also with respect to video data that is compressed and encoded in units of GOPs. Then, at the time of editing, almost no deterioration of picture quality occurs with respect to the edited video and the videos before and after this. Accordingly, a video editing apparatus which can adequately perform the desired editing with respect to video data recorded by the above method can be provided.

What is claimed is:

1. A video editing apparatus for performing insertion editing on a compressed video signal that has been formed through inter-frame correlation of a plurality of continuous video frames and has been encoded in units of groups of pictures, comprising:

decoding means for decoding the compressed video signal;

switching means for selectively outputting a video signal supplied from the decoding means and a video signal input from the outside wherein when said switching means selects said outside video, signal said outside video signal is inserted into said video signal from the decoding means without regard to the inter-frame correlation of the compressed video signal; and encoding means for compressing and encoding a video signal supplied from the switching means again so that the frame structure becomes the same as the group of picture frame structure at the time of compressing and encoding the video signal before the switching processing based on said group of picture frame structure.

2. A video editing apparatus as set forth in claim 1, wherein:

the decoding means outputs a GOP head pulse showing the head frame of the GOP from the compressed and encoded video signal which is input and the encoding means compresses and encodes the supplied GOP head pulse and the video signal supplied from the switching means.

3. A video editing apparatus as set forth in claim 1, wherein:

the encoding means compresses the video signal by the MPEG system and the decoding means decodes the compressed video signal by the MPEG system.

4. A video editing apparatus as set forth in claim 1, wherein said another video signal is recorded on the compressed and recorded video signal by recording an integer number of new GOPs onto said recording medium, such that said new GOPs overwrite said old GOPS, and such that there is no partial overwriting of old GOPs.

5. A video editing apparatus for performing insertion editing on a compressed video signal that has been formed through inter-frame correlation of a plurality of continuous video frames and has been encoded in units of groups of pictures, comprising:

decoding means for decoding the compressed video signal;

a control unit for outputting a selection control signal;

switching means for selectively outputting a video signal supplied from the decoding means and a video signal input from the outside based on the selection control signal supplied from the control unit, wherein when said switching means selects said outside video signal, said outside video signal is inserted into said video signal from the decoding means without regard to the inter-frame correlation of the compressed video signal; and encoding means for compressing and encoding a video signal supplied from the switching means again so that the frame structure becomes the same as the group of picture frame structure at the time of compressing and encoding the video signal before the switching processing based on said group of picture frame structure.

6. A video editing apparatus as set forth in claim 5, wherein the control unit is connected to an external interface and outputs the selection control signal based on an edit signal supplied via the interface.

7. A video editing apparatus as set forth in claim 5, wherein the control unit is connected to an external interface and outputs a recording control signal based on the edit signal supplied via the interface and a video signal compressed and coded based on the recording control signal is recorded on the recording medium.

8. A video editing apparatus as set forth in claim 5, wherein the decoding means detects the GOP head pulse indicating the head frame of the GOP from the compressed and encoded video signal which is input and the encoding means compresses and encodes the video signal supplied from the switching means in synchronization with the GOP head pulse.

9. An editing apparatus as vet forth in claim 5, wherein the encoding means compresses the input video signal by the MPEG system and the decoding means decodes the compressed and encoded video signal by the MPEG system.

10. A video editing apparatus as set forth in claim 5, wherein said another video signal is recorded on the compressed and recorded video signal by recording an integer number of new GOPs onto said recording medium, such that said new GOPs overwrite said old GOPs, and such that there is no partial overwriting of old GOPs.

* * * * *